United States Patent
Shanbhag et al.

(10) Patent No.: US 10,326,682 B2
(45) Date of Patent: Jun. 18, 2019

(54) INTERMEDIARY NETWORK ELEMENT FOR TAP TRAFFIC

(71) Applicant: HEWLETT PACKARD ENTERPRISE DEVELOPMENT LP, Houston, TX (US)

(72) Inventors: Pramod Shanbhag, Bangalore (IN); Mohammed Javed Padinhakara, Bangalore (IN); Santosh Kumar Singh, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 214 days.

(21) Appl. No.: 15/501,580

(22) PCT Filed: Apr. 2, 2015

(86) PCT No.: PCT/US2015/024102
§ 371 (c)(1),
(2) Date: Feb. 3, 2017

(87) PCT Pub. No.: WO2016/122693
PCT Pub. Date: Aug. 4, 2016

(65) Prior Publication Data
US 2017/0237645 A1    Aug. 17, 2017

(30) Foreign Application Priority Data
Jan. 29, 2015    (IN) .............. 426/CHE/2015

(51) Int. Cl.
*H04L 12/26* (2006.01)
*H04L 29/08* (2006.01)
*H04L 12/64* (2006.01)
*H04L 12/24* (2006.01)
*H04L 12/751* (2013.01)
*H04L 12/757* (2013.01)
*H04L 12/733* (2013.01)
*H04L 29/06* (2006.01)
*H04L 12/721* (2013.01)
*H04L 12/715* (2013.01)

(52) U.S. Cl.
CPC .......... *H04L 43/12* (2013.01); *H04L 12/6418* (2013.01); *H04L 41/0893* (2013.01);
(Continued)

(58) Field of Classification Search
None
See application file for complete search history.

(56) References Cited

U.S. PATENT DOCUMENTS

| 5,754,532 A | 5/1998 | Dev et al. |
| 6,141,690 A | 10/2000 | Weiman |

(Continued)

FOREIGN PATENT DOCUMENTS

| EP | 1529375 B2 | 11/2013 |
| KR | 1020050104106 A | 11/2005 |
| WO | WO-2006062961 A2 | 6/2006 |

OTHER PUBLICATIONS

Andre Dehon, "Robust, High-Speed Network Design for Large-Scale Multiprocessing," Sep. 1993, pp. 1-217, A.I. Technical Report No. 1445, MIT.

(Continued)

*Primary Examiner* — Christine T Duong
(74) *Attorney, Agent, or Firm* — Hewlett Packard Enterprise Patent Department (57) ABSTRACT

In one implementation, a method for tap traffic redirection can include identification of a request protocol and a source network element, selection of a redirector protocol based on a list of device capabilities, instruction of the source network element to send a first copy of network traffic to an intermediary network element using the redirector protocol, and instruction of the intermediary network element to forward a second copy of the network traffic using the request protocol.

15 Claims, 5 Drawing Sheets

(52) U.S. Cl.
CPC ............ *H04L 41/12* (2013.01); *H04L 43/062* (2013.01); *H04L 45/02* (2013.01); *H04L 45/023* (2013.01); *H04L 45/12* (2013.01); *H04L 45/122* (2013.01); *H04L 45/20* (2013.01); *H04L 67/2814* (2013.01); *H04L 69/08* (2013.01); *H04L 69/18* (2013.01); *H04L 45/64* (2013.01)

(56) References Cited

U.S. PATENT DOCUMENTS

| | | | |
|---|---|---|---|
| 6,310,894 | B1 | 10/2001 | Counterman |
| 7,797,243 | B2 | 9/2010 | Stadelmann et al. |
| 8,612,570 | B1 | 12/2013 | Nair et al. |
| 9,584,472 | B2 * | 2/2017 | Lyon .................... H04L 67/2814 |
| 2005/0114663 | A1 | 5/2005 | Cornell et al. |
| 2006/0095968 | A1 * | 5/2006 | Portolani ............ H04L 63/0218 |
| | | | 726/23 |
| 2008/0151754 | A1 * | 6/2008 | Sarin ....................... H04L 41/00 |
| | | | 370/235 |
| 2012/0269196 | A1 * | 10/2012 | Jones .................... H04L 12/18 |
| | | | 370/389 |

OTHER PUBLICATIONS

International Search Report and Written Opinion, International Application No. PCT/US2015/024102, dated Oct. 27, 2015, pp. 1-9, KIPO.

* cited by examiner

INTERMEDIARY NETWORK ELEMENT FOR TAP TRAFFIC

BACKGROUND

Computer networks commonly include switches, routers, and endpoints (such as servers or client devices) that are communicatively connected to transfer information between endpoints. Networks have evolved to include mobile computing devices, personal devices connected to business networks, virtual machines, and even virtual switches. Networks are commonly distributed across vendors of network devices and host multiple solutions, such as orchestration software and middle boxes, to meet daily customer requirements. As networks evolve, the importance of "network visibility" becomes very pertinent from the perspective of auditing, troubleshooting, and network data analytics. Network monitoring solutions can enable a network administrator to "tap" (i.e., copy and/or redirect) traffic at various tapping points in the network and use the tapped traffic for various analysis such as probing, auditing, and anomaly detection.

DETAILED DESCRIPTION

In the following description and figures, some example implementations of network tap apparatus, network tap systems, and/or methods for tap traffic redirection are described. Network monitoring solutions come in a variety of offerings. Traditionally techniques like sample-based monitoring (e.g., SFLOW), statistics-based monitoring (e.g., NETFLOW), port mirroring (e.g., SPAN), etc. have been widely used for achieving network visibility objectives (e.g., traffic tapping objectives). Software-defined network ("SDN") environments provide opportunities for more precise tapping and traffic analytics because of the centralized visibility and capability to steer and/or copy traffic on a per-flow basis.

Networks can include network elements from multiple vendors. Network monitoring software can depend on a uniform tapping mechanism across the network. To accomplish this, the network administrator may configure additional firewall policies or other mechanism-dependent configuration for such network monitoring software.

Various examples described below relate to providing uniform tapping across a network comprising heterogeneous network elements via a federation of devices. By identifying the tap technology capabilities of the network elements of the federation, traffic can be steered and transferred using multiple tap technologies (e.g., multiple tap protocols). A network element can indirectly support a tap technology (that is not directly supported on the network element) by leveraging a federated network element that supports the requested tap technology. In this manner, the use of multiple protocols can create a uniformity among tap technologies.

A network element, as used herein, represents any appropriate device of a network, such as a switch, a router, a middle box, or an endpoint compute device. The terms "include," "have," and variations thereof, as used herein, mean the same as the term "comprise" or appropriate variation thereof. Furthermore, the term "based on," as used herein, means "based at least in part on." Thus, a feature that is described as based on some stimulus can be based only on the stimulus or a combination of stimuli including the stimulus. Furthermore, the term "maintain" (and variations thereof) as used herein means "to create, delete, add, remove, access, update, and/or modify."

Figure 1:
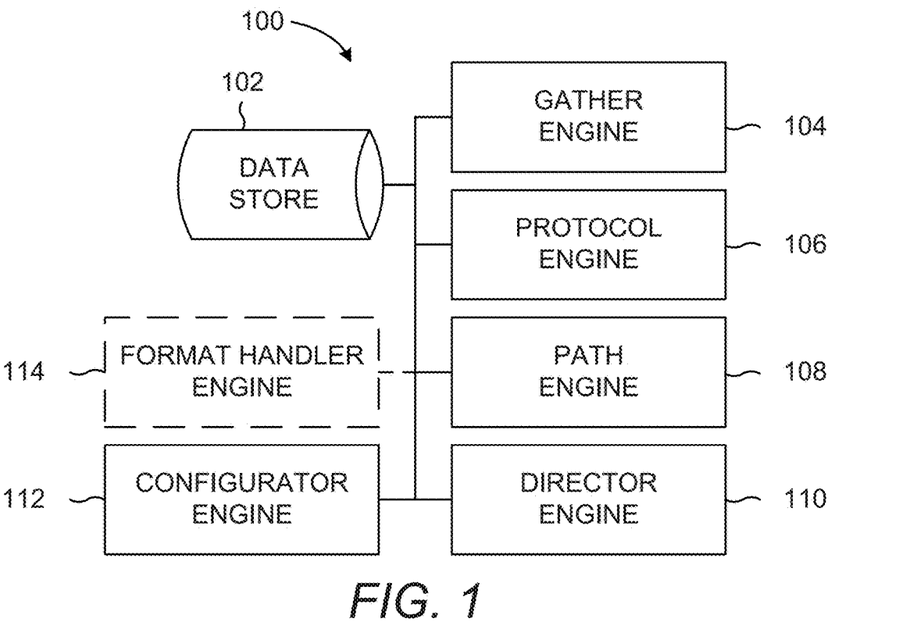
FIGS. 1 and 2 are block diagrams depicting example network tap systems.
Figure 2:
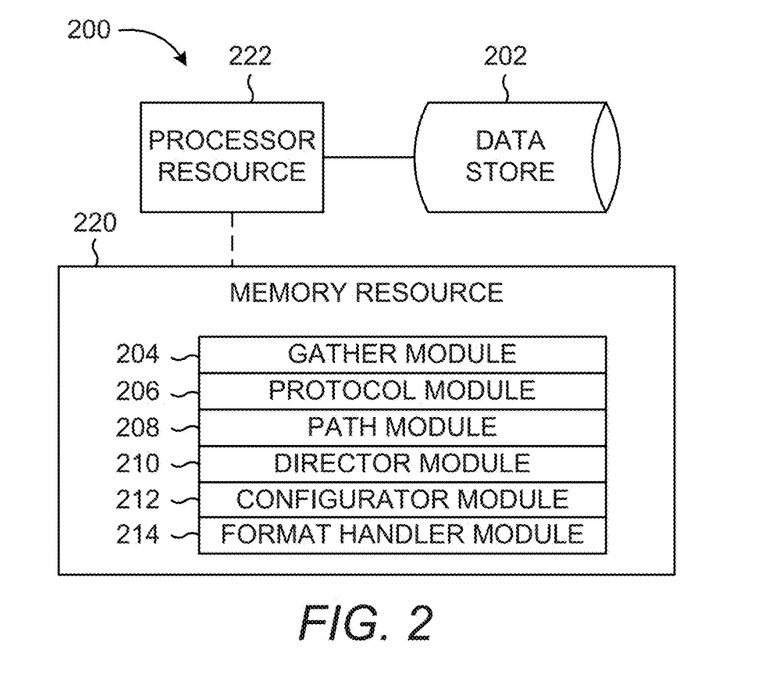

FIGS. 1 and 2 are block diagrams depicting example network tap systems 100 and 200. Referring to FIG. 1, the example network tap system 100 of FIG. 1 generally includes a data store 102, a gather engine 104, a protocol engine 106, a path engine 108, a director engine 110, and a configurator engine 112. In general, the configurator engine 112 configures a network element to route tap traffic through an intermediary network element identified from the director engine 110 based on information gathered by the gather engine 104, the protocol selected by the protocol engine 106, and the source (e.g., a network element designated as a target of a tap request to copy and/or steer network traffic) identified by the path engine 108. The example network tap system 100 can include a format handler engine 114 to translate tap traffic in one protocol to another, such as in a centralized embodiment as discussed herein.

The gather engine 104 represents any circuitry or combination of circuitry and executable instructions to obtain a list of device capabilities and topology information. For example, the gather engine 104 can represent a combination of circuitry and executable instructions to identify network elements that are members of a federation and the capabilities of those members. The gather engine 104 can retrieve information about a network element by making a request to the network element directly (e.g., via port connections of the network element to a neighbor network element where a neighbor network element is a directly-connected network element) or by accessing the information from a store location, such as a database stored on the data store 102. For example, each network element of the network can support an exchange of the set of supported protocols at startup of the network element with connected switches and/or the network controller of the network. The retrieved network information (also discussed herein as gathered data) can include a list of devices, a list of device capabilities, and topology information. Information related to device capabilities include supported tap capabilities (e.g., tap protocols and/or tap technologies) and may include device specifications and/or configurations.

The protocol engine 106 represents any circuitry or combination of circuitry and executable instructions to select a first tap protocol based on a tap request. For example, the protocol engine 106 can represent a combination of circuitry and executable instructions to identify a tap technology to complete the tap request and select a protocol used by the tap technology to copy traffic. The tap protocol of the request can be identified directly from the request or by translating the request into a set of parameters to tapping (such as using a mapping of keywords).

The path engine 108 represents any circuitry or combination of circuitry and executable instructions to identify a source network element to tap based on the tap request. For example, the path engine 108 can represent a combination of circuitry and executable instructions to parse the tap request for a source to tap or translate the tap request from a keyword to a particular network element targeted for tapping. The path engine 108 can further represent circuitry or a combination of circuitry and executable instructions to identify a path between a destination network element and the source network element based on the first tap protocol, the list of device capabilities, and the topology information. The path can be identified based on a minimum number of element hops between a first network element supporting the first tap protocol and a second network element supporting a second tap protocol. The path is to include an intermediary network element that supports a request protocol. In particular, the path is to include an intermediary network element.

The path engine 108 can identify a plurality of paths that include an intermediary network element that supports the first tap protocol by looking up route information in a local routing table. The route table information, in conjunction with the data gathered by the gather engine 104, can be used to identify paths from the source to the destination that include a network element that supports the requested tap protocol. The plurality of paths can be compared for the best route, such as based on the number of hops (i.e., network segments) between elements. For example, the path engine 108 can identify a first path that includes a switch A that supports the requested tap protocol via six hops and a second path that includes a switch B that supports the requested tap protocol via four hops. In that example, the director engine 110 can select switch B as the as the intermediary network element to redirect traffic because the second path is the one of the plurality of paths which supports the requested protocol with the least number of element hops.

The director engine 110 represents any circuitry or combination of circuitry and executable instructions to identify a second tap protocol supported by the source network element and an intermediary network element that supports the first tap protocol. For example, the director engine 110 can represent a combination of circuitry and executable instructions to identify a second tap protocol usable with the source network element based on a list of device capabilities and identify an intermediary network element having the first tap protocol based on the topology information. In a distributed mode, the director engine 110 can identify the intermediary network element that has the first tap protocol by using the topology information to identify which path is shortest and includes a network element that supports the requested tap protocol. For another example in distributed mode, the director engine 110 can identify the nearest network element that supports the requested tap protocol to the source network element and then the path engine 108 can identify a path from the nearest network element to a destination. The director engine 110 can identify multiple protocols to transfer tap traffic to the requested tap protocol. For example, the shortest path to a destination from a source may include converting the tap traffic at a first switch, converting the tap traffic again at a second switch, and then converting the tap traffic at a third switch to a protocol that is acceptable by the network element that can reproduce the tap traffic according to the requested tap protocol. In this manner, the director engine 110 and the path engine 108 can work together to identify a path that balances the path length and the number of conversions (i.e., changes of tap protocols) to an acceptable level of bandwidth utilization in order to permit tapping traffic of the network.

In a centralized embodiment, the director engine 110 can further represent circuitry or a combination of circuitry and executable instructions to cause a plurality of network elements of a tap domain to send a copy of network packets to the intermediary network element where the intermediary network element is to include a central database of tapped traffic of the tap domain (e.g., a network element discussed as a collector herein). In this manner, the director engine 110 can direct tap traffic to a central location via any appropriate protocol supported by the network element and convert the copy of the traffic to a format acceptable by the requested tap protocol. For example, a controller that includes the director engine 110 can configure a tap rule to send the received traffic to a collector (i.e., a network element designated to collect tap traffic) where the tap rule is a network flow rule.

In a centralized mode, the path identified is a path to a central collector and the tap traffic is steered to the central collector using a secondary protocol available to the source network element. Once at the intermediary network element (which may be the central collector), the traffic may be converted into the tap protocol requested by the tap request or otherwise sent to the destination via the requested tap protocol. More detail regarding centralized mode and the distributed mode is further illustrated in the description regarding FIG. 3.

The configurator engine 112 represents any circuitry or combination of circuitry and executable instructions to configure the source network element to direct tap traffic to an intermediary network element using a second tap protocol. For example, the flow table can be updated with a flow to redirect traffic using a particular protocol. The configurator engine 112 can adjust settings of a network element in accordance with the tap technology and can obtain the syntax of the protocol used by the tap technology being setup. For example, the manual changes that a network administrator would perform on a network element to adapt the network element to copy traffic in accordance with the tap request can be performed by the configurator engine 112. The configurator engine 112 can represent a combination of circuitry and executable instructions to identify a plurality of configuration settings of a network element, modify the plurality of configuration settings to utilize a tap protocol, and instruct the network element to direct tap traffic to an identified intermediary network element using a tap protocol that is supported by the identified intermediary network element. The configurator engine 112 can also configure the intermediary network element to convert received tap traffic from a first protocol to a second protocol and send the tap traffic using the second protocol on a path to a destination where the destination and the second protocol are specified by the tap request.

The format handler engine 114 represents any circuitry or combination of circuitry and executable instructions to generate tap traffic in a format used by a particular tap protocol. For example, the format handler engine 114 represents any circuitry or combination of circuitry and executable instructions to identify, based on a tap request, a log entry of a database of traffic associated with the source network element and convert the log entry to a format compatible with the protocol requested by the tap request. A format can be converted between protocols based on parsing a message in a first protocol (e.g., an initial protocol) to identify the relevant information to be transferred by a message in a second protocol (e.g., a final protocol). It is natural for some information to be lost or unavailable due to the conversion between protocols. The format handler engine 114 is useful in a centralized environment where tap traffic is being collect to a centralized device and requests for the tap traffic are being made to the centralized device, where it is likely that the tap traffic is collected in a protocol format that may not be the protocol format being requested from the centralized device. In a centralized mode, the centralized device can include a mapping (e.g., a data structure, a rule, or a combination thereof) that associates protocols and identifies the rules to convert from one format to another. In that example, the mapping may be updated by a network administrator or autonomously as new tapping protocols are made available to the network or unused protocols are removed from the network tap configuration.

A mapping of keywords to primitives can include a knowledge base and/or a machine-learned store of terms that can represent network information, such as a network element primitive. For example, the mapping can contain a data structure associating the string "conference room A" with strings "switch A" and "switch B" (or the media access control ("MAC") addresses associated with the switches A and B, respectively), so the map of keywords can generate the primitives of switch A and switch B when a tap configuration associated with the conference room A is requested. A mapping can represent any data structure or combination of data structures to provide association between identifiers (e.g., numbers, characters, strings, etc.). Example data structures usable as a mapping include an associative array, a tree, a map, a dictionary, and the like. In general, the mappings are used for lookups of associative terms and can be adapted to specific use cases by a network administrator.

The data store 102 can contain information utilized by the engines 104, 106, 108, 110, 112, and 114. For example, the data store 102 can store a tap request, a copy of traffic of the network, a list of devices, a list of device capabilities, topology information, a plurality of tap protocols, a route table, a mapping, and the like.

FIG. 2 depicts the example system 200 can comprise a memory resource 220 operatively coupled to a processor resource 222. The processor resource 222 can be operatively coupled to a data store 202. The data store 202 can be the same as the data store 102 of FIG. 1.

Referring to FIG. 2, the memory resource 220 can contain a set of instructions that are executable by the processor resource 222. The set of instructions are operable to cause the processor resource 222 to perform operations of the system 200 when the set of instructions are executed by the processor resource 222. The set of instructions stored on the memory resource 220 can be represented as a gather module 204, a protocol module 206, a path module 208, a director module 210, a configurator module 212, and a format handler engine 214. The gather module 204, the protocol module 206, the path module 208, the director module 210, the configurator module 212, and the format handler engine 114 represent program instructions that when executed function as the gather engine 104, the protocol engine 106, the path engine 108, the director engine 110, the configurator engine 112, and a format handler engine 114 of FIG. 1, respectively. The processor resource 222 can carry out a set of instructions to execute the modules 204, 206, 208, 210, 212, 214 and/or any other appropriate operations among and/or associated with the modules of the system 200. For example, the processor resource 222 can carry out a set of instructions to identify a redirector protocol available to a source network element based on a list of device capabilities, identify a path including an intermediary network element that supports a request protocol based on topology information and the tap request, configure a plurality of network elements of the path to form a flow of traffic via the path using a subset of tap protocols, and instruct the intermediary network element to convert the tapped traffic received in a first protocol to a second protocol. For another example, the processor resource 222 can carry out a set of instructions to identify a subset of tap protocol through which the request protocol could be achieved based on the tap request and network information (e.g., topology information and a list of device capabilities) and steer tapped traffic to an intermediary network element that supports the request protocol. For yet another example, the processor resource 222 can carry out a set of instructions to configure a network flow rule to send the received traffic to a collector (i.e., an intermediary network element that stores copies of traffic), distribute the flow rule to a network element, and instruct a destination network element to request traffic associated with the tap request from the collector in the requested tap protocol format.

Figure 4:
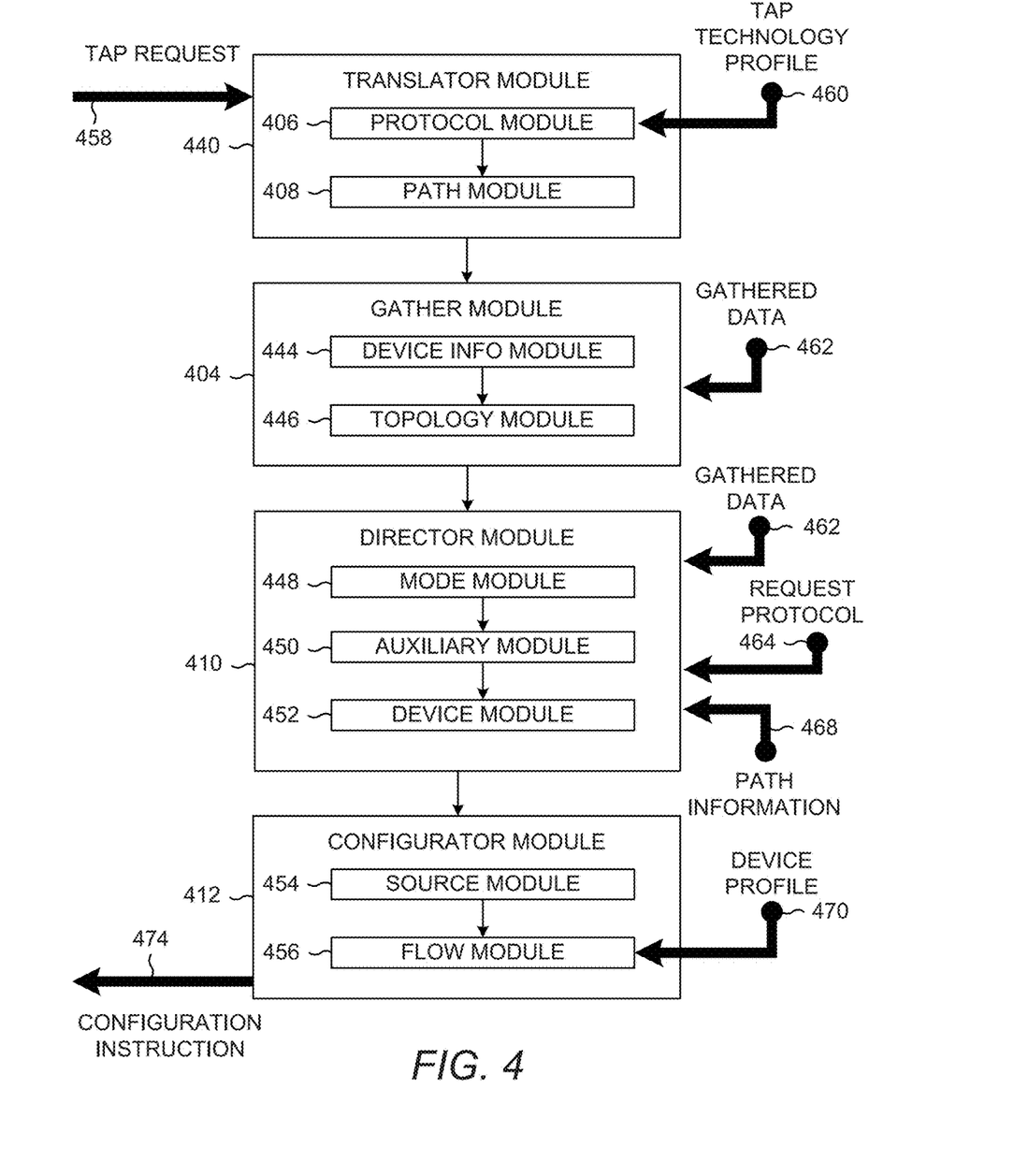
FIG. 4 depicts example modules used to implement example network tap systems.

Although these particular modules and various other modules are illustrated and discussed in relation to FIG. 2 and other example implementations, other combinations or sub-combinations of modules can be included within other implementations. Said differently, although the modules illustrated in FIG. 2 and discussed in other example implementations perform specific functionalities in the examples discussed herein, these and other functionalities can be accomplished, implemented, or realized at different modules or at combinations of modules. For example, two or more modules illustrated and/or discussed as separate can be combined into a module that performs the functionalities discussed in relation to the two modules. As another example, functionalities performed at one module as discussed in relation to these examples can be performed at a different module or different modules. FIG. 4 depicts yet another example of how functionality can be organized into modules.

The processor resource 222 is any appropriate circuitry capable of processing (e.g., computing) instructions, such as one or multiple processing elements capable of retrieving instructions from the memory resource 220 and executing those instructions. For example, the processor resource 222 can be a central processing unit ("CPU") that enables tap traffic redirection by fetching, decoding, and executing modules 204, 206, 208, 210, 212, and 214. Example processor resources 222 include at least one CPU, a semiconductor-based microprocessor, an application specific integrated circuit ("ASIC"), a field-programmable gate array ("FPGA"), and the like. The processor resource 222 can include multiple processing elements that are integrated in a single device or distributed across devices. The processor resource 222 can process the instructions serially, concurrently, or in partial concurrence.

The memory resource 220 and the data store 202 represent a medium to store data utilized and/or produced by the system 200. The medium is any non-transitory medium or combination of non-transitory mediums able to electronically store data, such as modules of the system 200 and/or data used by the system 200. For example, the medium can be a storage medium, which is distinct from a transitory transmission medium, such as a signal. The medium can be machine-readable, such as computer-readable. The medium can be an electronic, magnetic, optical, or other physical storage device that is capable of containing (i.e., storing) executable instructions. The memory resource 220 can be said to store program instructions that when executed by the processor resource 222 cause the processor resource 222 to implement functionality of the system 200 of FIG. 2. The memory resource 220 can be integrated in the same device as the processor resource 222 or it can be separate but accessible to that device and the processor resource 222. The memory resource 220 and/or the data store 202 can be distributed across devices. The memory resource 220 and the data store 202 can represent the same physical medium or separate physical mediums. The data of the data store 202 can include representations of data and/or information mentioned herein.

In the discussion herein, the engines 104, 106, 108, 110, 112, and 114 of FIG. 1 and the modules 204, 206, 208, 210, 212, and 214 of FIG. 2 have been described as circuitry or a combination of circuitry and executable instructions. Such components can be implemented in a number of fashions. Looking at FIG. 2, the executable instructions can be processor-executable instructions, such as program instructions, stored on the memory resource 220, which is a tangible, non-transitory computer-readable storage medium, and the circuitry can be electronic circuitry, such as processor resource 222, for executing those instructions. The instructions residing on the memory resource 220 can comprise any set of instructions to be executed directly (such as machine code) or indirectly (such as a script) by the processor resource 222.

In some examples, the system 200 can include the executable instructions can be part of an installation package that when installed can be executed by the processor resource 222 to perform operations of the system 200, such as methods described with regards to FIGS. 4-7. In that example, the memory resource 220 can be a portable medium such as a compact disc, a digital video disc, a flash drive, or memory maintained by a computer device, such as a service device 334 of FIG. 3, from which the installation package can be downloaded and installed. In another example, the executable instructions can be part of an application or applications already installed. The memory resource 220 can be a non-volatile memory resource such as read only memory ("ROM"), a volatile memory resource such as random access memory ("RAM"), a storage device, or a combination thereof. Example forms of a memory resource 220 include static RAM ("SRAM"), dynamic RAM ("DRAM"), electrically erasable programmable ROM ("EEPROM"), flash memory, or the like. The memory resource 220 can include integrated memory such as a hard drive ("HD"), a solid state drive ("SSD"), or an optical drive.

Figure 3:
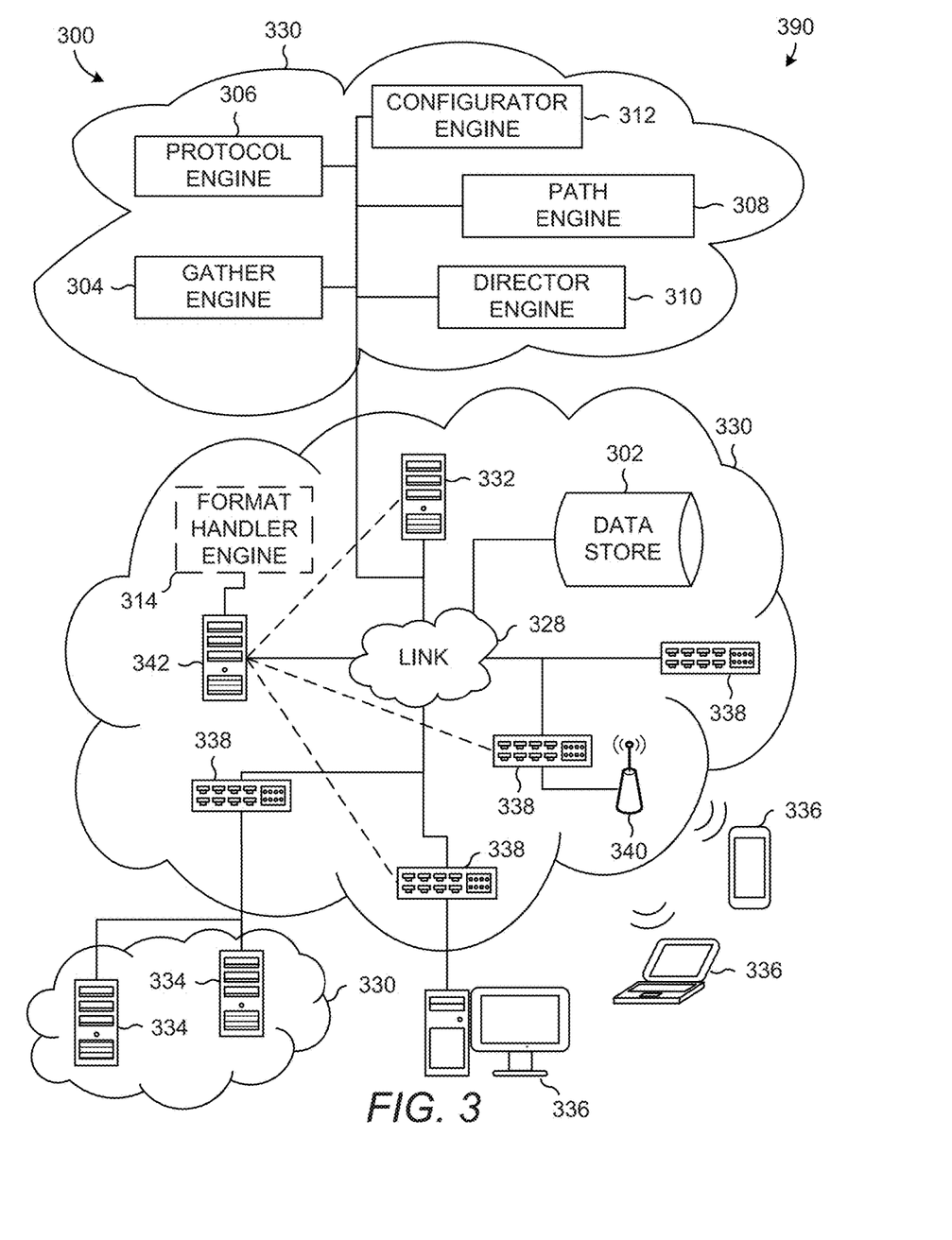
FIG. 3 depicts an example environment in which various network tap systems can be implemented.

FIG. 3 depicts example environments in which various example network tap systems can be implemented. The example environment 390 is shown to include an example system 300 for tap technology selection. The system 300 (described herein with respect to FIGS. 1 and 2) can represent generally any circuitry or combination of circuitry and executable instructions to select a tap technology based on selection criteria. The system 300 can include a gather engine 304, a protocol engine 306, a path engine 308, a director engine 310, and a configurator engine 312 that are the same as the gather engine 104, the protocol engine 106, the path engine 108, the director engine 110, and the configurator engine 112 of FIG. 1, respectively, and the associated descriptions are not repeated for brevity. The system 300 can also include a format handler engine 314 that is the same as the format handler engine 114 of FIG. 1. As shown in FIG. 3, the data store 302 (which is the same as data stores 102 of FIG. 1 and 202 of FIG. 2) and the engines 304, 306, 308, 310, 312, and 314 can be integrated into a compute device, such as an intermediary device 342 or a switch 338, or distributed across devices. The engines 304, 306, 308, 310, 312, and 314 can be integrated via circuitry or as installed instructions into a memory resource of the compute device.

The example environment 390 can include compute devices that are elements of the network, such as a controller 332, service devices 334, user devices 336, switches 338, wireless access point device 340, and an intermediary device 342. The controller 332 represents generally any compute device capable of managing the network. For example, the controller 332 can be a SDN controller that includes circuitry (or a combination of circuitry and executable instructions) to manage flows of traffic through the network 330 and execute a tap application, such as tap application to be a destination of the tap traffic (e.g., a network monitoring application). The service devices 334 represent generally any compute devices to respond to a network request received from a user device 336, whether virtual or real. For example, the service device 334 can operate a combination of circuitry and executable instructions to provide a network packet in response to a request for a page or functionality of an application. The user devices 336 represent generally any compute devices to communicate a network request and receive and/or process the corresponding responses. For example, a browser application may be installed on the user device 336 to receive the network packet from the service device 334 and utilize the payload of the packet to display an element of a page via the browser application. The switches 338 represent any network device capable of connecting devices of the network together. For example, a switch 338 can retain local routing information of paths describing how to transfer packets from a source to a destination.

In FIG. 3, the dotted lines represent logical connections between devices (such as between the controller 332, the intermediary device 342, and the switches 338) which may or may not be physically connected directly. For example, the switches 338 connected via dotted lines to the controller 332 can represent switches 338 selected as part of the tap domain to copy traffic to the controller 332, where the tap traffic is routed on a path through an intermediary device 342 rather than directly to the controller 332. In another example, the dotted lines may be between multiple switches where a switch can convert or otherwise redirect tapped traffic using the request protocol rather than redirecting the tapped traffic through a dedicated middle box, such as a tap sink device. The controller 332 can include circuitry to execute a tap application, such as a tap application for network monitoring that receives tap traffic (i.e., is a destination of the tap traffic). As mentioned, the intermediary device 342 can be a tap sink device, such as an intrusion detection system or an intrusion prevention system. For example, the intermediary device 342 can be a tap sink device including circuitry to execute a collector application to receive the tap traffic and perform analysis on the tap traffic.

In a distributed mode, the path engine 308 and the director engine 310 can work in conjunction to identify a path with a minimum number of hops (i.e., network segments that represent connections between devices) between a source and a destination that include a device that supports the tap request protocol. In a centralized mode, the path engine 308 identified the source and the path to the central collection device, represented as device 342 of FIG. 3. In this manner, all tapped traffic can be sent to a common collector of tap traffic. If the intermediary network element 342 is a collector device, then the intermediary network element 342 can include a format handler engine 314 that can format any data collected to a requested format known to the collector, such as the format of the protocol requested by the tap request. In an example of either mode, a first segment can provide tapped traffic in a first format (e.g., a format of a first protocol of a subset of tap protocols used along a path) that is different from a second format (e.g., a format of a second protocol of the subset of tap protocols used along the path) associated with a second segment.

The compute devices can be located on separate networks 330 or part of the same network 330. The example environment 390 can include any appropriate number of networks 330 and any number of the networks 330 can include a cloud compute environment, such as a virtual shared pool of compute resources. For example, networks 330 can be distributed networks comprising virtual computing resources. Any appropriate combination of the system 300 and compute devices can be a virtual instance of a resource of a virtual shared pool of resources. The engines and/or modules of the system 300 herein can reside and/or execute "on the cloud" (e.g., reside and/or execute on a virtual shared pool of resources).

A link 328 generally represents one or a combination of a cable, wireless connection, fiber optic connection, or remote connections via a telecommunications link, an infrared link, a radio frequency link, or any other connectors of systems that provide electronic communication. The link 328 can include, at least in part, intranet, the Internet, or a combination of both. The link 328 can also include intermediate proxies, routers, switches, load balancers, and the like.

Referring to FIGS. 1-3, the engines 104, 106, 108, 110, 112, and 114 of FIG. 1 and/or the modules 204, 206, 208, 210, 212, 214 of FIG. 2 can be distributed across devices 332, 334, 336, 338, 340, 342, or a combination thereof. The engine and/or modules can complete or assist completion of operations performed in describing another engine and/or module. For example, the director engine 310 of FIG. 3 can request, complete, or perform the methods or operations described with the director engine 110 of FIG. 1 as well as the gather engine 104, the protocol engine 106, the path engine 108, and the configurator engine 112 of FIG. 1. Thus, although the various engines and modules are shown as separate engines in FIGS. 1 and 2, in other implementations, the functionality of multiple engines and/or modules may be implemented as a single engine and/or module or divided in a variety of engines and/or modules. In some example, the engines of the system 300 can perform example methods described in connection with FIGS. 4-7.

FIG. 4 depicts example modules used to implement example network tap systems. Referring to FIG. 4, the example modules of FIG. 4 generally include a translator module 440, a gather module 404, a director module 410, and a configurator module 412. The gather module 404, the director module 410, and the configurator module 412 function similar to the gather module 204, the director module 210, and the configurator module 212 of FIG. 2. The example modules of FIG. 4 can be implemented on any appropriate compute device, such as a network switch, an SDN controller, or a tap sink.

The tap request 458 can activate the translator module 440 to cause a processor resource to translate the tap request 458, identify a source network element, and identify a request protocol. The translator module 440 can include program instructions, such as a protocol module 406 and a path module 408, to facilitate identification of the parameters of the tap request. The protocol module 406 and the path module 408 represent the same modules as the protocol module 206 and the path module 208 of FIG. 2, respectively, and, for brevity, the associated descriptions are not repeated.

For example, the processor resource that executes the protocol module 406 can utilize a tap technology profile 460 to identify a request protocol.

The gather module 404 can include program instructions, such as a device information module 444 and a topology module 446, to gather data 462 from the network. The device information module 444 represents program instructions that when executed cause a processor resource to retrieve and/or generate information associated with network elements of the network. For example, a processor resource that executes the device information module 444 can retrieve a list of devices and their capabilities via individual device retrieval or by querying a database of device profiles. The topology module 446 represents program instructions that when executed cause a processor resource to retrieve and/or generate topology information associated with the network elements of the network.

The director module 410 can include program instructions, such as a mode module 448, an auxiliary module 450, and a device module 452, to enable tap traffic to divert to a network element that can complete a tap request. The mode module 448 represents program instructions that when executed cause a processor resource to identify whether the network supports a distributed mode of operation or a centralized mode of operation. For example, if the processor resource executing the gather module 404 discovers a device is designated as a collector, then tap request can be completed based on a centralized mode of operation. The auxiliary module 450 represents program instructions that when executed cause a processor resource to identify a tap protocol available to the source network element that can be used to transfer the tapped traffic to an intermediary network element. The device module 452 represents program instructions that when executed cause a processor resource to select a network element that supports both the redirector protocol and the request protocol. For example, the intermediary network element is to receive traffic using the redirector protocol and send traffic using the request protocol. A processor resource executing the device module 452 can utilize the request protocol 464 and path information 468 to identify the intermediary network element to use for redirecting the tapped traffic.

The configurator module 412 can include program instructions, such as a source module 454 and a flow module 456, to provide configuration details to a network element. The source module 454 represents program instructions that when executed cause a processor resource to identify a configuration profile for the source network element to provide the tap traffic using the redirector protocol. The flow module 456 represents program instructions that when executed cause a processor resource to generate instructions to provide a forwarding rule to the network element based on a device profile 470 of the network element. A processor resource executing the configurator module 412 can generate a configuration instruction 474 to send to the network element to redirect the tapped traffic to the intermediary network element using the redirector protocol. The configuration instruction 474 can be sent to the source network element to configure the source network element to tap traffic according to the bounds of the tap request. Another configuration instruction can be sent to the intermediary network element to configure the intermediary network element to forward, using the requested tap protocol, tap traffic from the source network element. In this manner, the tap domain can be configured with a network tap configuration that can produce uniform tapping information by using an intermediary protocol to convert tapped traffic into the request protocol.

Figure 5:
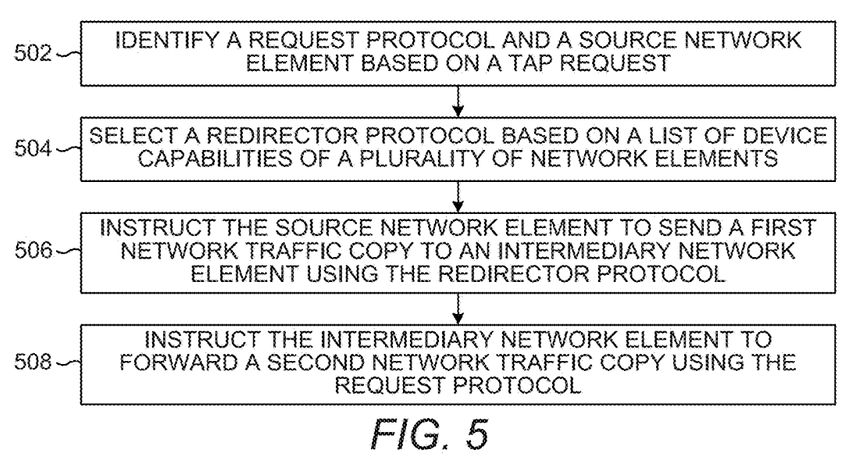
FIGS. 5 and 6 are flow diagrams depicting example methods for tap traffic redirection.
Figure 6:
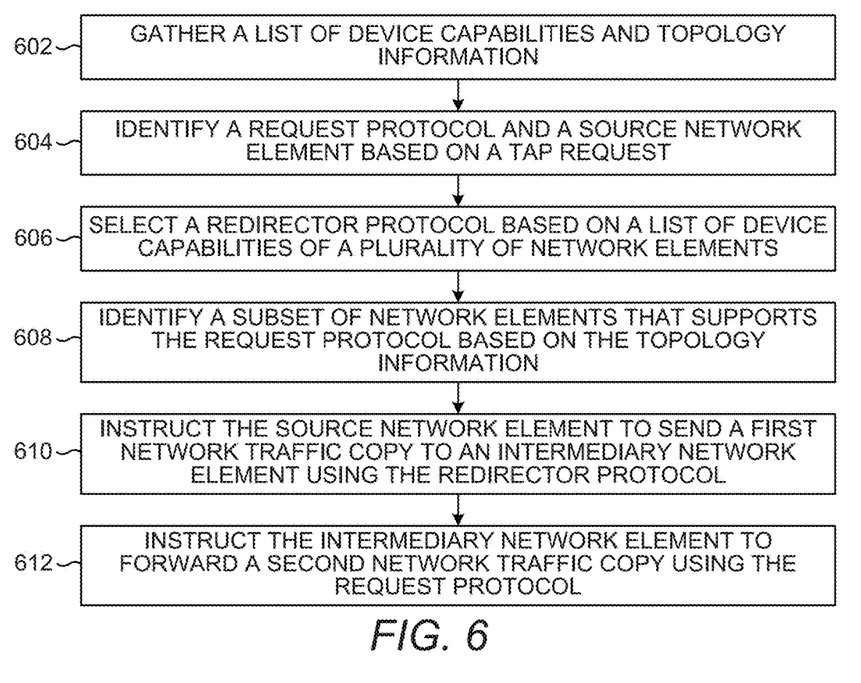
Figure 7:
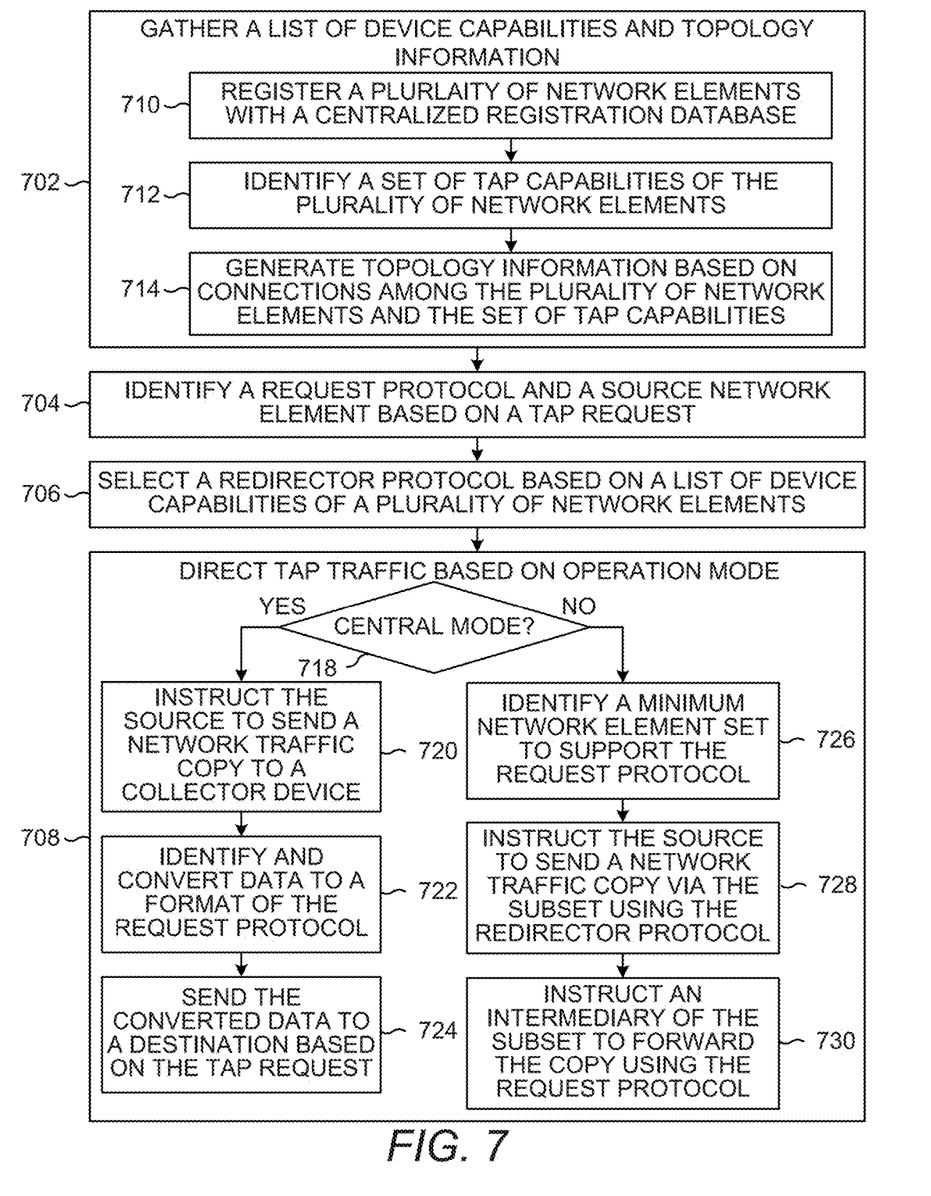
FIG. 7 depicts additional blocks and details generally regarding gathering network element information and directing tap traffic based on an operation mode.

FIGS. 5-7 are flow diagrams depicting example methods for tap traffic redirection. Referring to FIG. 5, example methods for tap traffic redirection can generally comprise identifying a request protocol and a source network element based on a tap request, selecting a redirector protocol based on a list of device capabilities, instructing the source to send a first copy of network traffic to an intermediary network element using the redirector protocol, and instructing the intermediary network element to forward a second copy of the network traffic using the request protocol.

At block 502, a request protocol and a source network element are identified. The request protocol and the source network element are identified from a tap request. For example, the request protocol and the source network element can be directly found as part of the tap request. For another example, the tap request can be translated (e.g., from phrases to identifiable keywords of a mapping) to discover the request protocol and the source network element.

At block 504, a redirector protocol is selected. The redirector protocol is one of the supported protocols of the source network element. For example, a list of device capabilities comprising a list of tap capabilities of the source network element can be retrieved from the source network element or a database of device capabilities, such as a database of device profiles of each network element of the network. The redirector protocol can be selected based on the tap request, such as selecting the redirector protocol that can transfer a sufficient amount of information to be with (e.g., converted to) the request protocol.

At block 506, the source network element is instructed to send a first copy of network traffic to an intermediary network element using the redirector protocol. For example, a controller can distribute a flow entry to the source network element to update the local flow table of the source network element to send duplicate traffic that matches a particular field or set of fields of a packet header where the duplicated packet is structured according to the redirector protocol with path information to guide the duplicated packet to a particular intermediary network element that supports the request protocol. At block 508, the intermediary network element is instructed to forward a second copy of network traffic using the request protocol. For example, a controller can distribute a flow entry to the intermediary network element to update the local flow table of the intermediary network element to transfer the information of the duplicated packet originating from the source network element into a second packet structured in the requested protocol and forward that second packet to the destination for tapping analysis (i.e., network monitoring purposes).

FIG. 6 includes blocks similar to blocks of FIG. 5 and provides additional blocks and details. In particular, FIG. 6 depicts additional blocks and details generally regarding gathering network element information and identifying a subset of network elements that supports the request protocol. Blocks 604, 606, 610, and 612 are the same as blocks 502, 504, 506 and 508 of FIG. 5 and, for brevity, their respective descriptions are not repeated.

At block 602, a list of device capabilities and topology information is gathered. Information about network elements can be gathered in a variety of ways, such as through a centralized database, a network management source, application programming interfaces, and network monitoring to name a few. FIG. 7 depicts an appropriate example of obtaining network information.

At block 608, a subset of network elements that supports the request protocol based on the topology information. Using data gathered at block 602, the network elements of the network that are capable of supporting the requested tap protocol are identified and placed in the subset. The subset can be narrowed to network elements that can receive the tapped traffic in a protocol supported by the source network element. The identification and selection of one of the subset to receive redirected traffic can be based on the closest network element to the source (e.g., least number of hops) and/or based on other thresholds or bounds set by a network administrator.

FIG. 7 includes blocks similar to blocks of FIG. 6 and provides additional blocks and details. In particular, FIG. 7 depicts additional blocks and details generally regarding gathering network element information and directing tap traffic based on an operation mode. Blocks 702, 704, and 706 are similar to blocks 602, 604, and 606 of FIG. 6, and, for brevity, their respective descriptions are not repeated in their entirety.

The collection of devices, device capabilities, and topology information of block 702 can include registration of network elements, identification of tap capabilities, and generation of topology information. At block 710, a plurality of network elements are registered with a centralized registration database. Gathering data can be facilitated by configuring network elements to register and update a database with their device profiles including their configuration information and/or state information. At block 712, a set of tap capabilities is identified. For example, each of the device profiles can contain information about the tap technologies supported by the device and/or the device profiles can be analyzed for attributes that meet the specifications of the tap technology, such as by comparing the attributes of the device profile to parameters of a tap technology profile. At block 714, topology information is generated based on the connections among the plurality of network devices and the set of tap capabilities. For example, the device profiles and/or routing information of each network element can be analyzed (or directly contain) the connections of each device to construct a topological map of the network element connections where such a map is further organized based on tap capabilities of each of the network elements. This can allow for dynamic construction of paths that are compatible for a given tap protocol.

At block 708, tap traffic is directed based on an operation mode. At block 718, it is decided whether the operation mode is a centralized mode or a distributed mode. For example, the existence of a collector device may support a centralized mode of operation.

If the operation mode is central, then the source network element is instructed to send a network copy to a collector device at block 720. At block 722, the data to be transferred to the request protocol is identified and converted to the format of the request protocol. The converted data is sent to a destination based on the tap request at block 724.

If the operation mode is distributed, then a network element set (e.g., a subset of network elements of the network) is identified comprising a minimum number of network elements to support the request protocol at block 726. The subset of network elements can be part of a federated model where each member of the subset is also a member of the federation. At block 728, the source network element is instructed to send a copy of network traffic via a path comprising the subset identified at block 726 using the redirector protocol supported by the source network element. An intermediary network element is included in the subset identified at block 726. At block 730, the intermediary network element is instructed to forward the copy of network traffic using the request protocol rather than the redirector protocol. In either mode, the tapped traffic can arrive at the destination network element (e.g., a destination device and/or application) in the protocol requested by the tap request even though the source network element that originates the tap traffic does not support the request protocol directly.

Although the flow diagrams of FIGS. 4-7 illustrate specific orders of execution, the order of execution may differ from that which is illustrated. For example, the order of execution of the blocks may be scrambled relative to the order shown. Also, the blocks shown in succession may be executed concurrently or with partial concurrence. All such variations are within the scope of the present description.

The present description has been shown and described with reference to the foregoing examples. It is understood, however, that other forms, details, and examples may be made without departing from the spirit and scope of the following claims. The use of the words "first," "second," or related terms in the claims are not used to limit the claim elements to an order or location, but are merely used to distinguish separate claim elements.

What is claimed is:

1. A network tap system comprising:
    a gather engine to obtain a list of device capabilities and topology information;
    a protocol engine to select a first tap protocol based on a tap request;
    a path engine to identify a source network element to tap based on the tap request; and
    a director engine to:
        identify a second tap protocol usable with the source network element based on the list of device capabilities; and
        identify an intermediary network element having the first tap protocol based on the topology information; and
    a configurator engine to configure the source network element to direct tap traffic to the intermediary network element using the second tap protocol.

2. The system of claim 1, wherein the path engine is further to:
    identify a path between a destination network element and the source network element based on the first tap protocol, the list of device capabilities, and the topology information, where the path includes the intermediary network element.

3. The system of claim 2, wherein:
    the gather engine is further to:
        retrieve a list of device capabilities from a neighbor network element via a port connection; and
    the path engine is further to:
        look up route information in a local routing table to identify a plurality of paths that include the intermediary network element that supports the first tap protocol; and
        compare a number of hops of each of the plurality of paths;
        wherein the identified path is one of the plurality of paths that has a minimum number of element hops between a first network element supporting the first tap protocol and a second network element supporting the second tap protocol.

4. The system of claim 1, wherein the director engine is further to:
cause a plurality of network elements of a tap domain to send a copy of network packets to the intermediary network element, the intermediary network element to include a central database of tapped traffic of the tap domain.

5. The system of claim 4, comprising:
    a format handler engine to:
        identify a log entry of the database associated with the source network element based on the tap request; and
        convert the log entry to a format compatible with the first protocol.

6. The system of claim 1, comprising at least one of:
    a controller including circuitry to execute a tap application, the tap application to be a destination of the tap traffic; and
    a tap sink device including circuitry to execute a collector application to receive the tap traffic, the tap sink device to be the intermediary network element.

7. A computer readable storage medium comprising a set of instructions executable by a processor resource to:
    identify a redirector protocol available to a source network element based on a list of device capabilities, the source network element designated as a target to tap network traffic;
    identify a path including an intermediary network element that supports a request protocol based on topology information and the tap request, the path to comprise a plurality of network elements;
    configure the plurality of network elements of the path to form a flow of traffic via the path using a subset of protocols, a first segment to provide tapped traffic in a first format of a first protocol of the subset of tap protocols that is different from a second protocol of the subset of tap protocols associated with a second segment; and
    instruct the intermediary network element to convert the tapped traffic received in the first protocol to the second protocol.

8. The medium of claim 7, wherein the set of instructions is executable by the processor resource to:
    configure a tap rule to send the received traffic to a collector, the tap rule to be a network flow rule and the collector to be a network element of the tap domain.

9. The medium of claim 7, wherein the set of instructions is executable by the processor resource to:
    identify the subset of tap protocols through which the request protocol could be achieved, the subset of tap protocols to include a redirector protocol to steer the tapped traffic to the intermediary network element that supports the request protocol.

10. The medium of claim 7, wherein the medium and the processor resource are coupled to a software-defined network ("SDN") controller.

11. A method for tap traffic redirection comprising:
    identifying a request protocol and a source network element based on a tap request;
    selecting a redirector protocol based on a list of device capabilities of a plurality of network elements, the plurality of network elements comprising the source network element;
    instructing the source network element to send a first copy of network traffic to an intermediary network element using the redirector protocol; and
    instructing the intermediary network element to forward a second copy of the network traffic using the request protocol.

12. The method of claim 11, comprising:
identifying a subset of network elements of a tap domain that support the request protocol based on topology information associated with the tap domain, the tap domain comprising heterogeneous network elements.

13. The method of claim 12, comprising:
identifying a minimum set of network elements of a tap domain through which the requested taping mechanism could be supported based on topology information associated with the tap domain.

14. The method of claim 11, comprising:
identifying a format of the request protocol;
converting data of the first copy of the network traffic into the identified format; and
sending the converted data to a destination network element based on the tap request, the second copy of the network traffic comprising the converted data.

15. The method of claim 11, comprising:
registering a plurality of network elements with a centralized registration database;
identifying a set of tap capabilities of the plurality of network elements; and
generating topology information based on connections among the plurality of network elements and the set of tap capabilities.

* * * * *